United States Patent [19]
Wire et al.

[11] 3,986,960
[45] Oct. 19, 1976

[54] FLUID FILTER

[76] Inventors: Philip J. Wire, 4123 Auxarms Drive, Apt. 2, Memphis, Tenn. 38128; James M. Stephenson, 3228 Lichen Drive, Bartlett, Tenn. 38134

[22] Filed: July 28, 1975

[21] Appl. No.: 599,538

Related U.S. Application Data

[63] Continuation of Ser. No. 475,769, June 3, 1974, abandoned.

[52] U.S. Cl. .............................. 210/232; 210/323 T; 210/440
[51] Int. Cl.² .................. B01D 25/02; B01D 25/08
[58] Field of Search ........... 210/238, 314, 323, 336, 210/335, 339, 438, 440, 442, 232

[56] References Cited
UNITED STATES PATENTS

| | | | |
|---|---|---|---|
| 1,165,640 | 12/1915 | Utz | 210/440 |
| 2,212,647 | 8/1940 | Nugent | 210/440 |
| 2,338,345 | 1/1944 | Mather | 55/484 |
| 2,684,763 | 7/1954 | Siskavitch | 210/238 |
| 2,738,879 | 3/1956 | Frantz | 210/339 |
| 2,742,155 | 4/1950 | Sather | 210/442 |
| 3,389,802 | 6/1968 | Stobe | 210/345 |
| 3,390,778 | 7/1968 | Uhen | 210/314 |
| 3,877,451 | 4/1975 | Lipscomb | 210/440 |

Primary Examiner—Charles N. Hart
Assistant Examiner—Ernest G. Therkorn
Attorney, Agent, or Firm—Joseph L. Spiegel

[57] ABSTRACT

A fluid filter comprises a tubular canister having a contaminated fluid inlet and a filtered fluid outlet. A one piece, replaceable, multiple inlet element is inserted into the canister, the element including a tube having a plurality of axially spaced apart containers mounted serially therealong, each of the containers having a closed bottom connected to the tube and an open top. A filter element is supplied in each of the containers and foraminous means space the filter element from the bottom of the containers to form a chamber therebetween. Ports in the tube communicate with the chamber and a seal is effected between the outlet of the canister and the tube, while fluid communication is provided between the inlet and the open tops of the containers whereby fluid flow between the inlet and the outlet takes place through the filter elements.

The purpose of this abstract is to enable the public and the patent office to determine rapidly the subject matter of the technical disclosure of the application. This abstract is neither intended to define the invention of the application nor is it intended to be limiting as to the scope thereof.

5 Claims, 3 Drawing Figures

FLUID FILTER

This is a continuation of application Ser. No. 475,769, filed June 3, 1974, now abandoned.

BACKGROUND OF THE INVENTION

The present invention relates to fluid filters, and in particular relates to a filter having a multiplicity of integral filter elements which may be easily field replaced as a unit. The stacking of filter elements in a single container to handle large volumes of oil or other fluid media for filtering purposes is well known in the art. Typically, such devices include separable filter elements which are stacked about a central return tube for effecting parallel flow of fluid media through each of the filter elements and combining of the outlets of the filters into a common clean oil or fluid outlet from the filter. Typically such filters are field replaceable requiring removal of the entire element and replacement of each of the filter elements. While the operation of such filters is satisfactory, excessive down time of the associated equipment to which the filter is connected during operation results during replacement.

In view of the above it is a principal object of the present invention to provide a unitary, multiple inlet, easily replaceable element comprised of multiple filters which may be replaced as a single unit for quick field replacement.

Another object of the present invention is to provide a multiple filter element which may be used for large capacity filtration such as in turbine generators, main and auxiliary feed pumps for boilers, oil consoles and reservoirs, and for large stationary and mobile engine installations.

Yet another object of the present invention is to provide a disposable and replaceable cartridge of multiple filtered elements which may quickly and easily be placed in the field without excessive down time of associated equipment.

BRIEF DESCRIPTION OF THE DRAWING

Other objects and a more complete understanding of the invention may be had by referring to the accompanying specification and claims taken in conjunction with the associated drawing in which:

DESCRIPTION OF THE PREFERRED EMBODIMENTS

Figure 1:
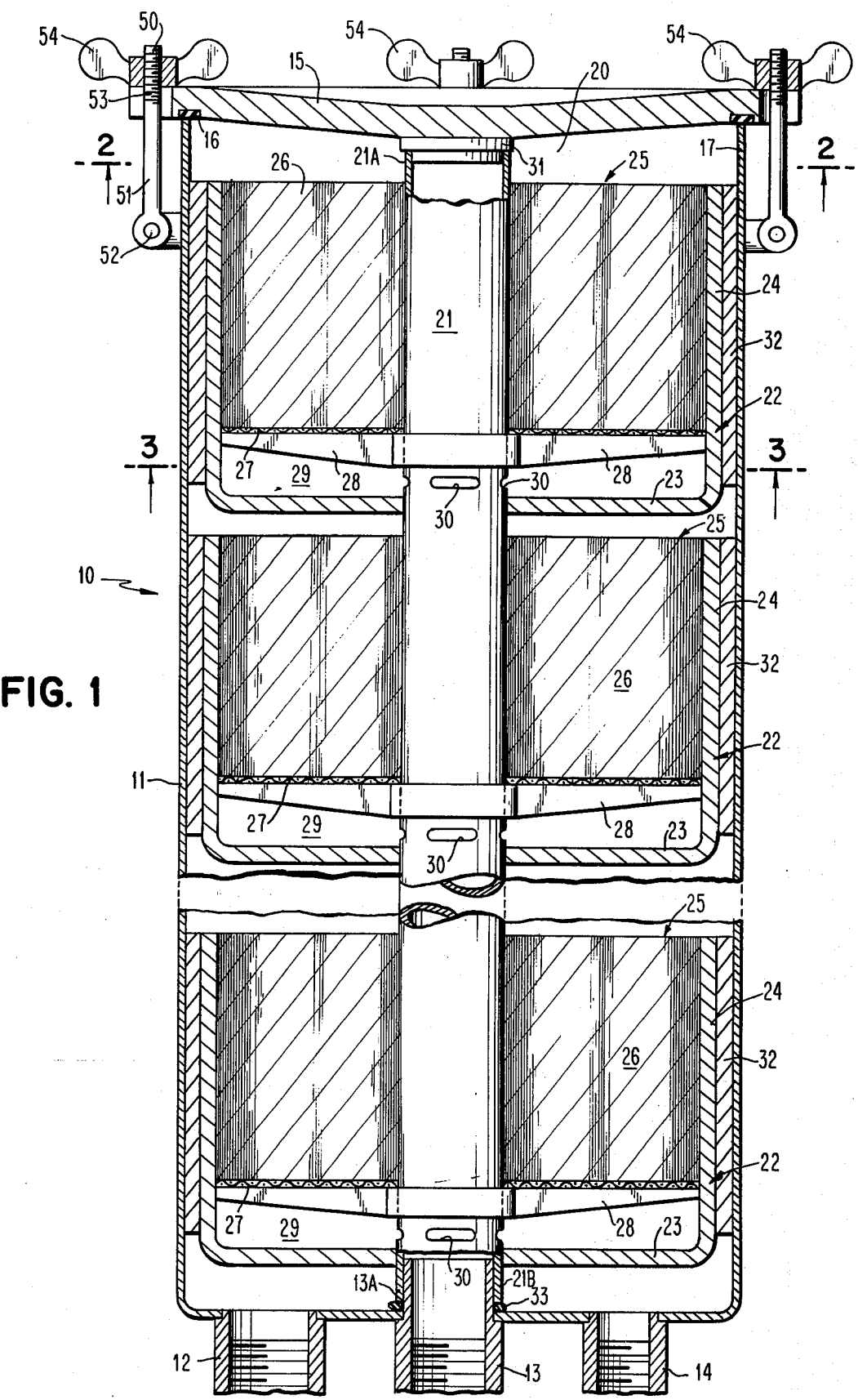
FIG. 1 is a fragmentary sectional view in side elevation of a fluid filter constructed in accordance with the present invention.
Figure 2:
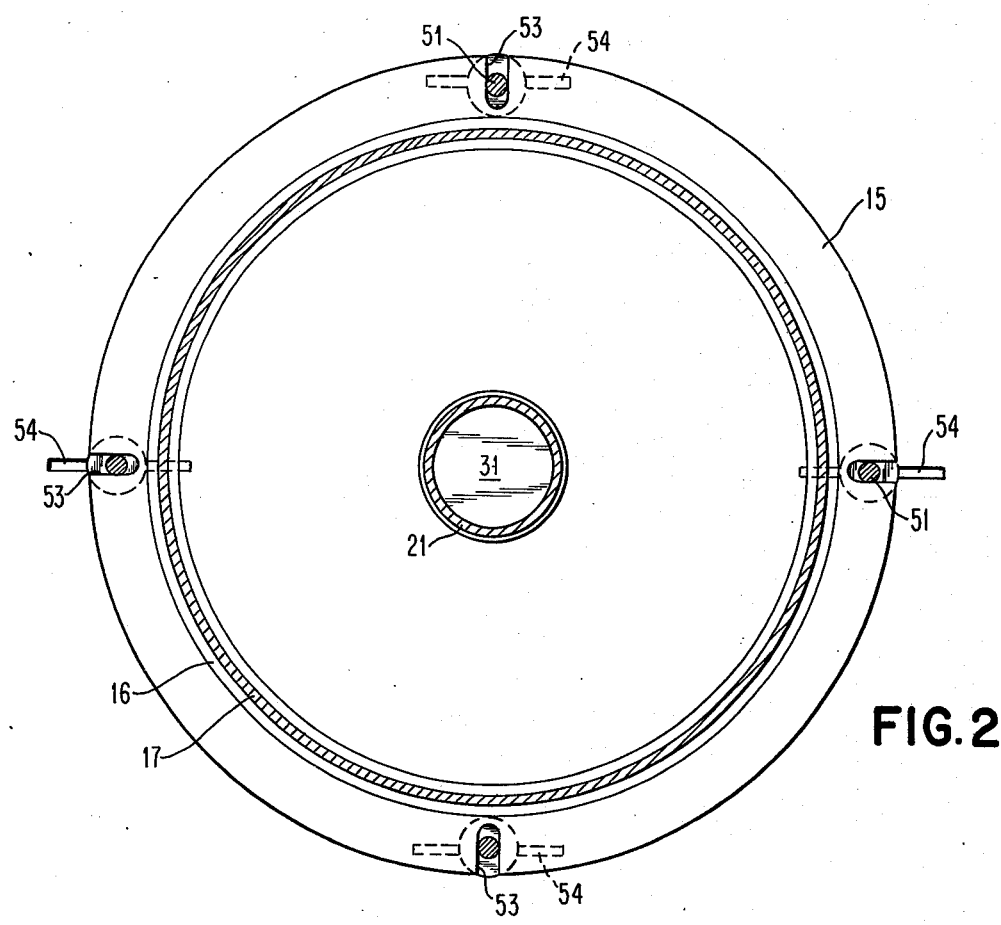
FIG. 2 is a fragmentary sectional view taken along line 2—2 of FIG. 1.

Referring now to the drawing, and especially FIG. 1 thereof, a fluid filter 10 constructed in accordance with the present invention is shown as including a disposable, unitary or one piece multiple inlet element 20 which is in fluid communication with and serves to filter contaminated fluid therein and to discharge filtered fluid therefrom.

In accordance with the invention the fluid filter 10 comprises a tubular canister 11 as of stainless steel, having a contaminated fluid inlet 12 and a filtered fluid outlet 13 disposed therein. A high pressure by-pass port 14, which may be connected to a pressure relief valve (not shown) serves as a safety passage and a high pressure dump when the pressure interiorly of the canister reaches a pre-determined level, or the filters of the multiple inlet element become clogged.

As shown in FIG. 1, the canister includes a dished lid 15 including a circumferentially extending seal 16 adapted to register and mate in sealing engagement with the extended terminus 17 of the canister 11. Latch means 50 serve to engage and press down the canister lid to seal the upper end of the canister 11 and, as will be more fully explained hereinafter, to effect an outlet seal of the discharge of fluid from the filters to the filtered fluid outlet 13.

In accordance with the invention, the unitary or one piece, multiple inlet element 20 is adapted for insertion as a single element or unit into the canister in a quick and easy manner so as to facilitate speed of replacement and reduce excessive down time of associated machinery to which the filter 10 is connected. To this end, the multiple inlet element 20 comprises a tube 21 having a plurality of axially spaced apart containers 22 mounted serially therealong. As shown, each of the containers has a closed bottom portion 23, an upstanding circumferentially extending side wall 24 which merges into the bottom wall 23 and an open top portion 25, the bottom wall being connected, in any convenient manner such as epoxy, resins, etc., to the central tube 21. A filter element 26 is disposed in each of the containers, and foraminous means 27, in the present instance screen material, rests on radially extending supports 28 the foraminous means or screen 27 spacing the filter element 26 from the bottom wall 23 to form a chamber 29 therebetween. Ports 30 extend through the wall of the tube 21 communicating with the chamber 29 thus providing fluid communication between the chamber 29 and the filtered fluid outlet 13. The supports 28 may be connected to the interior of upstanding side wall 24 of the containers 22 and include a central annulus in close embracing relationship with the tube 21. This structure permits ease of placement of the containers 22 onto the tube 21.

In assembly, the lower most container 22 is positioned on the tube with the screen 27 in place and the filter element 26 is placed in the container, the container then being bonded as by a suitable material to the tube 21. Then the bottom wall of the next adjacent container is spaced from the open top 25 of the preceding one. When all of the containers have been mounted and allowed to set on the tube with the ports 30 in registry with the chambers 29, the upper end 21A of the tube 21 may be provided with a cap 31 to seal the tube and, in a manner which will be more fully explained hereinafter, provide a bearing surface to effect a seal of the tube 21 relative to the filtered fluid outlet 13.

Figure 3:
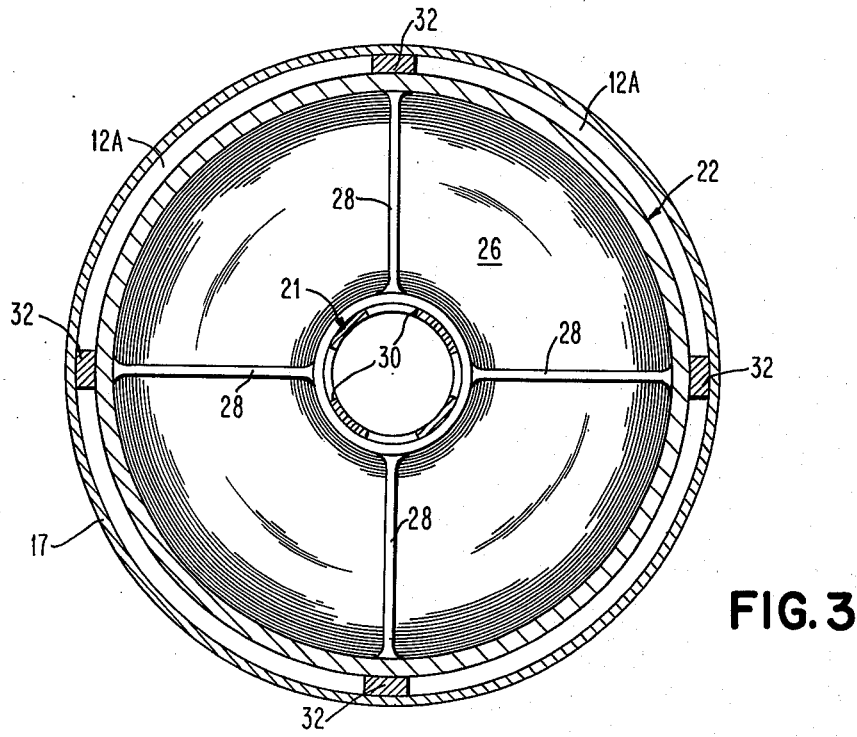
FIG. 3 is a section view taken along line 3—3 of FIG. 1.

In order to provide fluid communication to the filter elements from the contaminated fluid inlet 12, means are provided for cooperation with the interior of the canister and the exterior of the containers to define inlet fluid flow passages to the open tops 25 of the containers. To this end, and referring now to FIGS. 1 and 3, spacers 32 may be mounted on the periphery of the containers 22, the spacers being circumferentially spaced about the containers so as to define contaminated oil flow passages 12A therebetween. Additionally, the spacers serve as guides when inserting the multiple inlet element 20 into the canister.

Additional guide means may be provided, if desired, for the tube 21. In the illustrated instance, and referring to FIG. 1, the filtered fluid outlet 13 may be comprised of a nipple having an inwardly projecting portion 13A which has an outside diameter adapted to fit interiorly of the tube 21. Circumferentially of the inwardly projecting portion 13A of the filtered fluid outlet 13 and resting on the bottom of the canister 11 is on O-ring seal 33 against which the lower terminal end 21B of the tube 21 registers. The registration of the tube against the seal 33 inhibits outlet fluid contamination by unfiltered fluid from the inlet 12.

In order to insure a tight seal of the tube, the canister lid 15 is dimensioned to engage the cap 31 at the upper end 21A of the tube 21 and to force the lower terminal end 21B of the tube against the seal 33. To this end, the canister lid is forced against the cap 31 by the latch means 50. As may be obvious, the latch means may take any particular convenient form, in the illustrated instance the latch means comprising pivotally mounted bolts 51 which are connected as by pivots 52 for swinging in an arc outwardly from the side of the canister. The lid 15, is turn, includes slots or the like 53 which capture the bolts 51 and permit tightening down of the lid 15 as by wing nuts 54. It should be noted that the dished construction of the canister lid 15 helps provide a minor spring-like biasing action upon the tube 21 effecting the seal of the tube at its lower terminal end against the seal 33.

It will be recognized by one skilled in the art that the filter elements 26 may be composed of a variety of filter media depending upon the fluid to be filtered, its viscosity, size of particle to be trapped within the filter, and other filter media requirements. Typically, the filter may employ porous paper tissue similar to toilet paper, or the filtering element may be constructed of a plurality of layers of thin, tightly packed fibrous material.

In operation, suitable connection may be made to the contaminated fluid inlets, outlets and high pressure by-pass port 14, and the filtering action may then commence. Contaminated fluid entering the canister 11 by way of the fluid inlet 12 will fill up the interior of the canister until pressure reaches a level sufficient to permit fluid passage through the filter elements 26. Thereafter the oil will pass into the chamber 29 through the ports 30 and out the filtered fluid outlet 13. When the filter elements become loaded or excessively contaminated, pressure will increase in the canister and an increased pressure drop may be noted at the outlet 13, or at the high pressure by-pass port 14. This will signal that the filter media has become clogged and it is time to replace the unit. If the supply and discharge lines are provided with suitable valves and by-pass lines, operation of the associated machinery need not be curtailed inasmuch as shutting off such valving and releasing the canister lid will permit removal of the element 20 as a unit and insertion of a new such element. Thereafter, upon tightening down of the lid 15, the unit may be brought back onto the line.

Thus the fluid filter of the present invention provides for a quick replacement of the element while premitting the filtering of high volumes of fluid media such as oil.

The filter of the present invention can be made in a variety of heights and diameter and with various sizes of supply and return to accommodate any quantity of liquid and flow required, with pressure per square inch as stipulated by the user's requirements. Also, the filter is depicted with three containers 22 mounted serially along the tube 21. It is obvious that the invention is not restricted to three containers in number and that a greater or lesser number can be used, depending upon user requirements.

Although the invention has been described with a certain degree of particularity, it is understood that the present disclosure has been made only by way of example and that numerous changes in the details of construction and the combination and arrangement of parts may be made without departing from the spirit and scope of the invention as hereinafter claimed.

What is claimed is:

1. A fluid filter comprising in combination: a tubular canister having a contaminated fluid inlet and a centrally disposed filtered fluid outlet, said canister further including an upper portion having an extended terminus and a lower portion having a nipple projecting inwardly of said filtered fluid outlet and a seal circumscribing said nipple; a filtering element disposed vertically within said canister, said element comprising a solid tube having an upper and a lower terminal end and forming a vertical, central conduit within said canister;

a plurality of axially spaced-apart containers mounted serially along said tube, each of said containers having a closed bottom connected to said tube, upstanding circumferentially extending side walls and an open top portion, filter means disposed in said containers, said filter means comprising a roll of absorbent tissue, said containers being of lesser diameter than said canister and forming passageways from said contaminated fluid inlet to said filter means within said filtering element, means spacing said filter means from said container bottom to form a chamber therebetween, and, port means in said tube for providing fluid communication from said chambers to the interior of said tube, said canister nipple being dimensioned to fit interiorly of said filtering element tube, cap means for said upper terminal end of said tube, said tube forming the sole fluid communication means between the interior of said canister and said filtered fluid outlet and isolating said contaminated fluid inlet from said filtered fluid outlet; and, canister closing means adapted to be secured over said canister and in sealing engagement with said tube and biasing said tube against said filtered fluid outlet, said canister closing means including a lid having a circumferentially extending seal for registration and mating in sealing engagement with said extended terminus of said tubular canister and latch means for clamping said lid to said canister, for effecting engagement between said tube cap means and said lid to effect a fluid seal at said tube upper terminal end and for biasing said tube against said nipple seal to effect a fluid seal at said tube lower terminal end.

2. A fluid filter in accordance with claim 1 wherein said means spacing said filter means from said bottom includes a screen.

3. A fluid filter in accordance with claim 2 including radially extending supports underlying said screen, in said chamber.

4. A fluid filter in accordance with claim 1 including spacer means circumferentially spaced about said containers to define fluid flow passageways between said spacers, said containers, and the interior of said canister.

5. A fluid filter in accordance with claim 4 wherein said spacers are connected to said containers.

\* \* \* \* \*